United States Patent
Lee et al.

(10) Patent No.: US 7,418,711 B1
(45) Date of Patent: Aug. 26, 2008

(54) MESSAGING BRIDGE THAT FACILITATES COMMUNICATION WITH A MAINFRAME ENVIRONMENT

(75) Inventors: Wing Lee, Irving, TX (US); Kenny Yang, Plano, TX (US); Qi Liu, Plano, TX (US)

(73) Assignee: Sprint Communications Company L.P., Overland Park, KS (US)

(*) Notice: Subject to any disclaimer, the term of this patent is extended or adjusted under 35 U.S.C. 154(b) by 622 days.

(21) Appl. No.: 10/424,622

(22) Filed: Apr. 28, 2003

(51) Int. Cl.
  *G06F 9/54* (2006.01)
  *G06F 9/46* (2006.01)
  *G06F 3/00* (2006.01)
(52) U.S. Cl. .................. 719/314; 719/313; 709/223
(58) Field of Classification Search ............ 719/313, 719/314; 709/223
  See application file for complete search history.

(56) References Cited

U.S. PATENT DOCUMENTS

| | | | | |
|---|---|---|---|---|
| 6,138,168 | A * | 10/2000 | Kelly et al. | 719/310 |
| 6,721,779 | B1 * | 4/2004 | Maffeis | 709/202 |
| 6,804,818 | B1 * | 10/2004 | Codella et al. | 719/315 |
| 7,069,559 | B2 * | 6/2006 | Janssen et al. | 719/314 |
| 2002/0138582 | A1 * | 9/2002 | Chandra et al. | 709/206 |
| 2003/0093576 | A1 * | 5/2003 | Dettinger et al. | 709/313 |
| 2004/0039742 | A1 * | 2/2004 | Barsness et al. | 707/10 |
| 2004/0139166 | A1 * | 7/2004 | Collison | 709/207 |
| 2004/0162880 | A1 * | 8/2004 | Arnone et al. | 709/206 |
| 2004/0254993 | A1 * | 12/2004 | Mamas | 709/206 |

OTHER PUBLICATIONS

"SonicMQ bridges the gap," Apr. 18, 2001, Progress Software SA Press Release on ITWeb, pp. 1-2.*
"BEA WebLogic Server and BEA WebLogic Express Administration Guide," Jun. 24, 2002, Chapter 18.*

* cited by examiner

*Primary Examiner*—Li B Zhen

(57) ABSTRACT

A system for communication between a mainframe environment and a Java environment. The system can consist of a mainframe messaging system resident in the mainframe environment having an outbound and an inbound queue, a Java messaging system resident in the Java environment having an outbound and an inbound queue, and an intermediate messaging system coupled to the outbound and inbound queues of the mainframe messaging system and coupled to the outbound and inbound queues of the Java messaging system. The Java environment may be a J2EE environment. The mainframe messaging system may be an MQSeries messaging system and the Java messaging system may be a JMS messaging system. The outbound queue of the mainframe messaging system may communicate only messages directed to the Java environment and the inbound queue of the mainframe messaging system may communicate only messages directed from the Java environment.

18 Claims, 2 Drawing Sheets

MESSAGING BRIDGE THAT FACILITATES COMMUNICATION WITH A MAINFRAME ENVIRONMENT

CROSS-REFERENCE TO RELATED APPLICATIONS

Not applicable

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the transfer of data between disparate computing systems. More specifically, a bridge is provided that facilitates messaging between a mainframe system and a J2EE-based system.

BACKGROUND OF THE INVENTION

In a large enterprise with multiple diverse computing platforms, it is sometimes necessary for communications to occur between disparate computer systems. For example, a mainframe-based system might need to send a message to an application running under the Java 2, Enterprise Edition (J2EE) platform. Numerous middleware software programs are commercially available to facilitate such a data transfer. IBM, for example, provides a software family known as MQSeries that is claimed to be able to connect any two computing systems in common commercial use. Numerous interfaces might be present within MQSeries that can connect various combinations of platforms. One interface might connect a mainframe to a Java application that uses the MQSeries native protocol while another interface might connect a mainframe to a Java application that uses Java Messaging Service (JMS), a set of messaging interfaces defined by Sun Microsystems.

When a mainframe wants to send a message to a particular MQSeries client, the message is placed on a particular MQSeries queue. There is a one-to-one relationship between the MQSeries message initiators and the message receivers. A table is maintained on the mainframe that describes which messages go to which queues. If a new application is added to the mainframe, a new entry must be made to the table in the mainframe and a new queue must be created in MQSeries.

This method of communication between a mainframe and a set of clients is illustrated in FIG. 1. A mainframe computing system 12 uses three different queues 14, 16, and 18 to send messages. The queues distribute the messages to the appropriate clients 22, 24, and 26. While three message queues and three clients are shown in FIG. 1, other quantities of message queues and clients could be present.

With existing technology, if a mainframe needs to send a message to a J2EE-based application, the message might be sent from the mainframe to MQSeries and then from MQSeries to the JMS interface within MQSeries. On the J2EE side, another JMS interface is typically present. The MQSeries-based JMS interface might send the message to the J2EE-based JMS interface, which would then pass the message on to the J2EE-based application. The transfer of messages in this manner has several drawbacks. First, different vendors can implement different versions of JMS and the different implementations are not necessarily compatible. Thus, the transfer of data between MQSeries-based JMS and J2EE-based JMS can be inefficient and can require labor and time on the part of information technology experts to resolve the discrepancies between the different versions of JMS. Second, such a transfer method could create a security breach. With a direct link between MQSeries and J2EE, a J2EE-based component could have direct access to the data-sensitive mainframe environment. Third, such a direct link does not allow the monitoring or logging of data that is transferred between the mainframe and JMS.

SUMMARY OF THE INVENTION

An embodiment of the invention is a system for communication between a mainframe environment and a Java environment that consists of a mainframe messaging system resident in the mainframe environment having an outbound and an inbound queue, a Java messaging system resident in the Java environment having an outbound and an inbound queue, and an intermediate messaging system coupled to the outbound and inbound queues of the mainframe messaging system and coupled to the outbound and inbound queues of the Java messaging system. The Java environment may be a J2EE environment. The mainframe messaging system may be an MQSeries messaging system and the Java messaging system may be a JMS messaging system. The outbound queue of the mainframe messaging system may communicate only messages directed to the Java environment and the inbound queue of the mainframe messaging system may communicate only messages directed from the Java environment. The outbound queue of the mainframe messaging system communicating messages to the Java environment may be only a single outbound queue and may be the only queue directing messages to the Java environment. The inbound queue of the mainframe messaging system communicating messages from the Java environment may be only a single inbound queue and may be the only queue directing messages from the Java environment. The intermediate messaging system may be coupled to the mainframe environment only through the inbound and outbound queues of the mainframe messaging system. The outbound queue of the mainframe messaging system may communicate all messages directed to all environments outside the mainframe environment and the inbound queue of the mainframe messaging system may communicate all messages directed from all environments outside the mainframe environment. The outbound queue of the mainframe messaging system communicating messages to all environments outside the mainframe environment may be only a single outbound queue and may be the only queue directing messages to all environments outside the mainframe environment. The inbound queue of the mainframe messaging system communicating messages from all environments outside the mainframe environment may be only a single inbound queue and may be the only queue directing messages from all environments outside the mainframe environment. The Java messaging system may comprise at least two Java messaging clients resident on different servers and each Java messaging client may be coupled to the intermediate messaging system by at least one inbound queue and at least one outbound queue.

An alternative embodiment is a method for communicating between a mainframe environment and a Java environment that consists of an application in the mainframe environment generating a message to an application in the Java environment, placing the message in a mainframe messaging system, the mainframe messaging system sending the message on an outbound queue to an intermediate messaging system, the intermediate messaging system consuming the message on the outbound queue of the mainframe messaging system and directing the message to an appropriate queue in a Java messaging system, and the Java messaging system delivering the message to the application in the Java environment. The mainframe messaging system may be an MQSeries messaging system and the Java messaging system may be a JMS messaging system. The outbound queue on the mainframe messaging system may be a single queue for all messages directed from the mainframe environment to the Java environment or may be a single queue for all messages bound outside the mainframe. The intermediate messaging system may consume all messages from the outbound queue of the mainframe messaging system and distribute the messages to the Java messaging system or may consume all messages from the outbound queue of the mainframe messaging system and distribute the messages to the appropriate messaging system for the destination environment.

Another alternative embodiment is a method for communicating between a Java environment and a mainframe environment that consists of an application in the Java environment generating a message to an application in the mainframe environment, placing the message in a Java messaging system, the Java messaging system sending the message on an outbound queue to an intermediate messaging system, the intermediate messaging system consuming the message on the outbound queue of the Java messaging system and directing the message to an inbound queue in a mainframe messaging system, and the mainframe messaging system delivering the message to the mainframe application. The Java messaging system may be a JMS messaging system and the mainframe messaging system may be an MQSeries messaging system. The inbound queue on the mainframe messaging system may be a single queue for all messages directed from the Java environment to the mainframe environment or may be a single queue for all messages directed from environments outside the mainframe environment toward the mainframe environment. The intermediate messaging system may consume all messages directed from the Java environment to the mainframe environment and distribute all of the messages to the inbound queue of the mainframe messaging system.

DETAILED DESCRIPTION OF THE PREFERRED EMBODIMENTS

An embodiment of the present invention acts as a bridge that provides a means for transferring data between disparate computing systems. One computing system can send a message to the bridge which then wraps the message in a format appropriate for a second computing system and transfers the message to the second computing system. In an embodiment, one system is a mainframe system, the other system is a J2EE-based system, and the messages are transferred between the two systems and the bridge by means of the JMS messaging system. In this case, the bridge can be referred to as a JMS bridge. In a typical transfer of data, a mainframe sends a message to MQSeries, MQSeries sends the message to its JMS interface, and the JMS interface sends the message to the JMS bridge. The JMS bridge acts as a JMS client and consumes the message from the mainframe. The JMS bridge then acts as a JMS message supplier and sends the message to a J2EE-based JMS interface, which acts as a message consumer. The J2EE-based JMS interface then sends the message to a J2EE-based component. In this way, the JMS bridge acts as an intermediate messaging system between MQSeries and JMS.

If J2EE, rather than the mainframe, originates a message, the flow described above reverses. That is, a J2EE-based component sends a message to its J2EE-based JMS interface which then sends the message to the JMS bridge. The JMS bridge acts as a JMS client and consumes the message from the J2EE-based JMS interface. The JMS bridge then acts as a JMS message supplier and sends the message to the MQSeries-based JMS interface which acts as a message consumer. The MQSeries-based JMS interface sends the message to MQSeries which then sends the message to the mainframe.

The JMS bridge allows a single queue to be used for all messages being sent out of the mainframe to a J2EE-based client. Mainframe applications that need to communicate with a J2EE-based client contain logic that causes all messages destined for a J2EE-based client to be placed on this single queue. Such messages contain a header that specifies the J2EE-based client to which the message should be delivered. The JMS bridge can receive a message from the mainframe via the queue, read the header, and send the message to the appropriate J2EE-based client. The mainframe can thus send all messages destined for a J2EE-based client to the JMS bridge, regardless of the receiver of the message. The messages are then handled and redistributed on the bridge layer.

Figure 1:
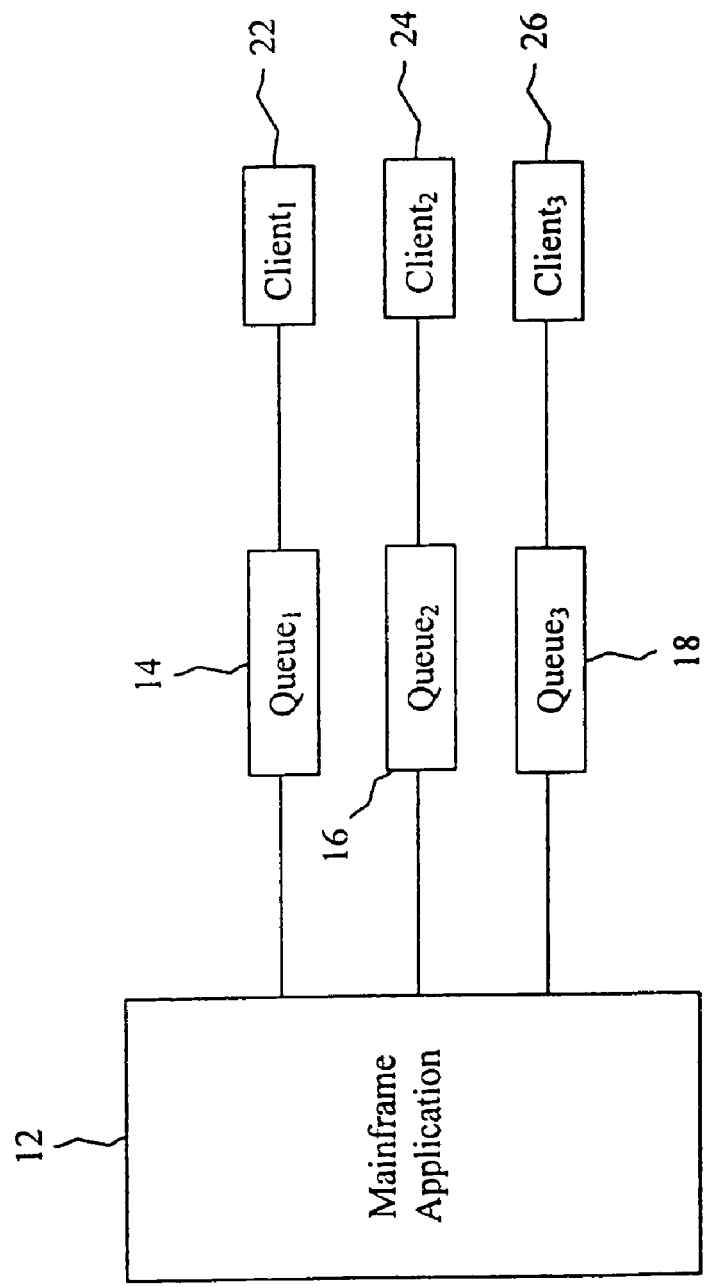
FIG. 1 is a block diagram depicting a method of communication between a mainframe computing system and a set of workstation clients under the prior art.
Figure 2:
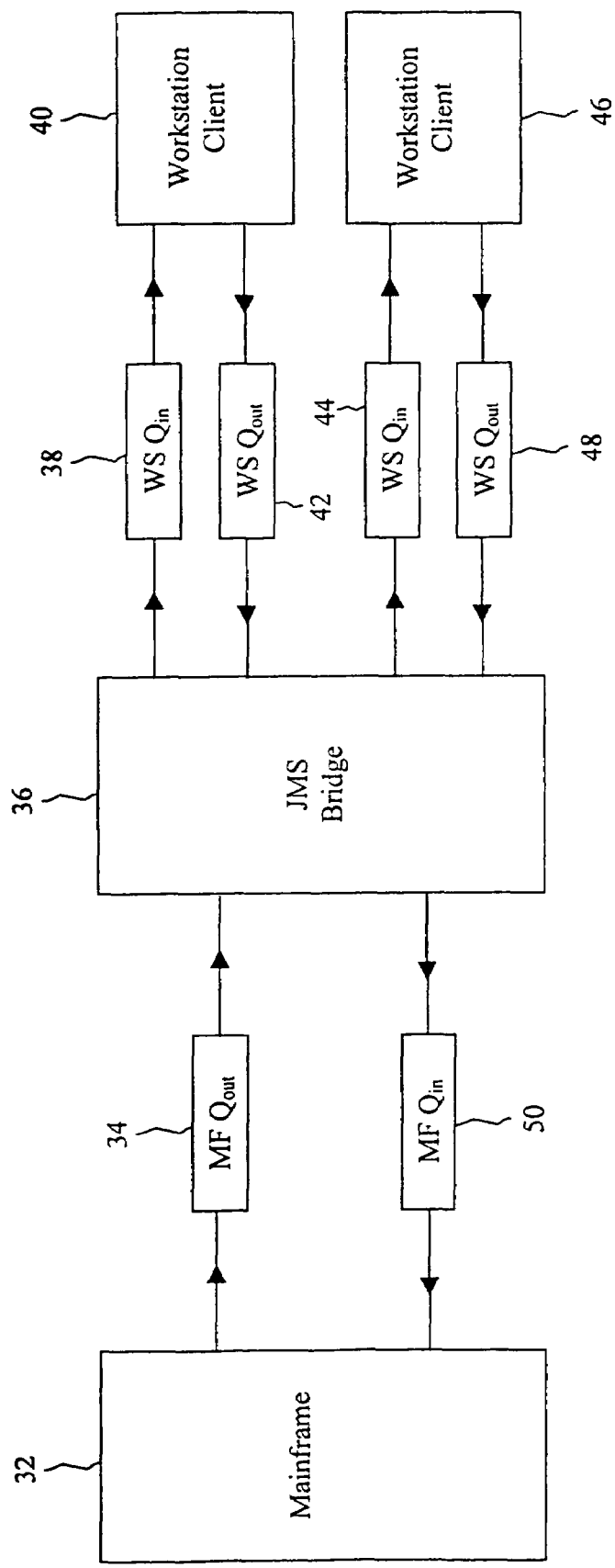
FIG. 2 is a block diagram depicting a method of communication between a mainframe computing system and a set of workstation clients under an embodiment of the JMS Client Framework.

An embodiment of the use of the JMS bridge for communication between a mainframe and a workstation client is illustrated in FIG. 2. A message is sent from the mainframe 32 to a mainframe outbound queue 34. The mainframe outbound queue 34 then sends the message to the JMS bridge 36. The JMS bridge 36 determines the workstation client to which the message should be delivered and sends the message to the appropriate application inbound queue, workstation inbound queue 38, for example. The workstation inbound queue 38 then sends the message to the workstation client to which it is connected, workstation client 40 in this case.

When the workstation client 40 sends a message to the mainframe 32, the flow of data reverses. The workstation client 40 sends the message to its workstation outbound queue, workstation outbound queue 42 in this case, which then sends the message to the JMS bridge 36. The JMS bridge sends the message to mainframe inbound queue 50 which then sends the message to the mainframe 32. While only two sets of workstation clients and inbound and outbound workstation queues are shown in FIG. 2, other quantities could be present.

The JMS bridge provides improved management, monitoring, and control over messages flowing between a mainframe and a J2EE-based component. An administrative interface can be provided within the JMS bridge that allows message tracing, monitoring, and logging capabilities and the ability to create status reports. The administrative interface can also create, start, and stop individual queues.

The JMS bridge can add security to a diverse computing system by acting in the manner of a firewall between MQSeries and J2EE and preventing direct communication between a J2EE-based component and a mainframe.

The JMS bridge reduces the risk of future compatibility issues. If the need to use a messaging system other than JMS ever arose, the JMS bridge could wrap the new system so that the new system could see the JMS Application Programming Interface. Any application that can be wrapped by JMS could be plugged into the JMS bridge and its behavior would not need to change. The application could send messages in its normal manner and the JMS bridge could wrap the messages with JMS. This would allow a client to always see the same interface no matter how the back end components might be configured. Also, since each side of the bridge has a different interface, if a messaging system other than JMS were to be used on one side of the bridge, only the interface on that side of the bridge would need to be changed. Thus, the JMS bridge not only allows a mainframe and a J2EE-based component to communicate with each other, it also facilitates communication between either of those systems and any messaging system.

MQSeries can have both a native MQSeries Java interface to a mainframe and a JMS interface to a mainframe. In the communication method described above between a mainframe and a workstation client, either the MQSeries Java interface or the JMS interface could be used. Improved performance can generally be attained with the MQSeries Java interface because the JMS layer is eliminated. The drawback of using the MQSeries Java interface directly is that it requires the distribution of MQSeries Java interface code and libraries into the J2EE environment. Such a code distribution can require a large up-front expenditure of labor and time and long-term code maintenance burdens. For this reason, the use of the JMS interface is a preferred embodiment.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

What is claimed is:

1. A system, operation using at least one processor, for communication between a mainframe environment and a client environment comprising:
   a mainframe messaging system resident in the mainframe environment configured to communicate messages with the client environment through a sole outbound queue and a sole inbound queue, wherein the sole outbound queue is the only queue for sending messages from the mainframe messaging system to the client environment, and wherein the sole inbound queue is the only queue for receiving messages at the mainframe messaging system from the client environment;
   a plurality of client messaging systems resident in the client environment, each of the client messaging systems communicates messages through a corresponding set of queues comprising a sole outbound queue and a sole inbound queue, wherein each of the client messaging systems is configured to send messages to the sole outbound queue and receive messages from the sole inbound queue in the corresponding set of queues;
   an intermediate messaging system coupled to the sole outbound queue and the sole inbound queue of the mainframe messaging system and coupled to each of the corresponding set of queues of the client messaging systems, wherein the intermediate messaging system prevents direct communication between the mainframe messaging system and the client messaging systems; and
   an administrative interface coupled to the intermediate messaging system that is configured to perform message tracing, monitoring, logging, create status reports, and manage individual queues,
   wherein the intermediate messaging system is configured to communicate messages between the plurality of client messaging systems and the mainframe messaging system, and wherein the intermediate messaging system exclusively communicates messages with the sole inbound queue and the sole outbound queue of the mainframe messaging system.

2. The system of claim 1 wherein the intermediate messaging system is only coupled to the mainframe messaging system of the mainframe environment through the sole inbound from the client environment and the sole outbound queue to the client environment.

3. The system of claim 1 wherein the sole outbound queue of the mainframe messaging system communicates all messages directed to all environments outside the mainframe environment and the sole inbound queue of the mainframe messaging system communicates all messages directed from all environments outside the mainframe environment.

4. The system of claim 1, wherein the intermediate messaging system is configured to determine which client messaging system each message on the sole outbound queue of the mainframe messaging system should be delivered.

5. The system of claim 4, wherein the intermediate messaging system is configured to send each message to the sole inbound queue of the determined client messaging system.

6. The system of claim 5, wherein the intermediate messaging system is configured to receive messages from the sole outbound queues of the plurality of client messaging systems and to send the received messages to the sole inbound queue of the mainframe messaging system.

7. The system of claim 1, wherein the intermediate messaging system is configured to act in the manner of a firewall.

8. The system of claim 1, wherein the intermediate messaging system is configured to wrap messages received from client messaging systems in diverse messaging environments such that the messaging systems in the diverse messaging environments send messages in their normal manner.

9. A method for communicating between a mainframe environment and a-client environment comprising:
   generating a message from an application in the mainframe environment directed to an application in the client environment;
   placing the message in a mainframe messaging system;
   sending the message with the mainframe messaging system to an outbound queue of the mainframe messaging system, wherein the outbound queue of the mainframe messaging system is the sole outbound queue from the mainframe messaging system to the client environment;
   receiving the message by an intermediate messaging system, wherein the intermediate messaging system exclusively receives messages from the outbound queue of the mainframe messaging system, and wherein the intermediate messaging system prevents direct communication between the mainframe messaging system and the client environment;
   consuming the message by the intermediate messaging system from the outbound queue of the mainframe messaging system; and
   sending the message to a single inbound queue out of a plurality of inbound queues, wherein each of the plurality of inbound queues corresponds with only one client messaging system that is coupled to the intermediate messaging system;

consuming the message from the single inbound queue by a client messaging system corresponding to the single inbound queue, wherein the client messaging system is coupled to the application in the client environment;

delivering the message with the client messaging system corresponding to the single inbound queue to the application in the client environment; and performing message tracing, monitoring, logging, create status reports, and manage individual queues with the intermediate messaging system.

10. The method of claim 9 wherein the mainframe messaging system is a different type of messaging system than the client messaging system.

11. The method of claim 9 wherein the intermediate messaging system consumes all messages from the outbound queue of the mainframe messaging system and distributes the messages to a corresponding client messaging system.

12. The method of claim 9, further comprising:

determining the single inbound queue that corresponds to the client messaging system coupled to the application in the client environment.

13. The method of claim 9, further comprising:

performing functions of a firewall with the intermediate messaging system.

14. A method for communicating between a client environment and a mainframe environment comprising:

generating a plurality of messages from applications in the client environment to an application in the mainframe environment;

placing messages from each application in a corresponding client messaging system of a plurality of client messaging systems;

each client messaging system sending a portion of the messages to a sole outbound queue;

receiving the messages from the plurality of client messaging systems through a plurality of the sole outbound queues with an intermediate messaging system;

consuming the messages on the plurality of the sole outbound queues with the intermediate messaging system;

directing the messages to an inbound queue of a mainframe messaging system, wherein the inbound queue of the mainframe messaging system is the sole inbound queue from the client environment to the mainframe messaging system, wherein the intermediate messaging system exclusively sends messages to the inbound queue of the mainframe messaging system, and wherein the intermediate messaging system prevents direct communication between the mainframe messaging system and the client environment;

delivering the message to the mainframe application with the mainframe messaging system; and performing message tracing, monitoring, logging, creating status reports, and managing individual queues with the intermediate messaging system.

15. The method of claim 14 wherein the client messaging system is a different type of messaging system than the mainframe messaging system.

16. The method of claim 14 wherein the inbound queue on the mainframe messaging system is for receiving all messages directed from environments outside the mainframe environment toward the mainframe environment.

17. The method of claim 14, further comprising:

performing functions of a firewall with the intermediate messaging system.

18. The method of claim 17, further comprising:

wrapping messages that are received from the outbound queues of a portion of the client messaging systems.

* * * * *